United States Patent
Katz Ohayon et al.

(10) Patent No.: US 11,816,693 B2
(45) Date of Patent: Nov. 14, 2023

(54) LOYALTY PLATFORM INTEGRATION PROCESSING

(71) Applicant: NCR Corporation, Atlanta, GA (US)

(72) Inventors: Julie Dvora Katz Ohayon, Ashdod (IL); Shimei Ben Faiman, Zur Moshe (IL); Yisrael Shmuel Kraus, Tel Mond (IL); Anatoly Leonid Slobodskoy, Central District (IL); Eldar Yarden, Ariel (IL)

(73) Assignee: NCR Corporation, Atlanta, GA (US)

( * ) Notice: Subject to any disclaimer, the term of this patent is extended or adjusted under 35 U.S.C. 154(b) by 50 days.

(21) Appl. No.: 16/668,062

(22) Filed: Oct. 30, 2019

(65) Prior Publication Data

US 2021/0133793 A1    May 6, 2021

(51) Int. Cl.
*G06Q 30/02*        (2023.01)
*G06Q 30/0226*    (2023.01)
(Continued)

(52) U.S. Cl.
CPC ..... *G06Q 30/0227* (2013.01); *G06Q 30/0209* (2013.01); *G06Q 30/0218* (2013.01)

(58) Field of Classification Search
CPC .............. G06Q 30/02; G06Q 30/0227; G06Q 30/0209; G06Q 30/0218; G06Q 30/0254;
(Continued)

(56) References Cited

U.S. PATENT DOCUMENTS 9,576,428 B2 * 2/2017 Argue ................. G07F 17/3255
9,833,714 B2 * 12/2017 Olson ................ G06Q 30/0202
(Continued)

FOREIGN PATENT DOCUMENTS

AU    2006287354 A1 * 3/2007 ............. G06F 19/00
CN       104903924 A * 9/2015 ............. G06Q 20/10
(Continued)

OTHER PUBLICATIONS

C.E. Sharp; M. Rowe, online games and e-business: Architecture for integrating business models and services into online games (English), IBM Systems Journal (vol. 45, Issue: 1, pp. 161-179), Jan. 1, 2006 (Year: 2006).*

(Continued)

*Primary Examiner* — Marilyn G Macasiano
(74) *Attorney, Agent, or Firm* — Schwegman Lundberg & Woessner, P.A.

(57) ABSTRACT

A loyalty gamification server platform with a plurality of micro-services are provided. Custom-defined rules permit gamification elements to be integrated as enhancements into loyalty applications though interaction with the micro-services using a platform Application Programming Interface (API). Artifacts associated with rewards and status level of rewards are earned based on activities associated with transactions of a user in accordance with the rules. Social (Continued)

standing artifacts are also earned based on the same or different activities. In an embodiment, users form a community and a dashboard microservice permits each user's ranking relative to games, competitions, status, and social standing to be viewed relative to other users of the community as a dashboard presentation on a display of a transaction terminal or a user device.

14 Claims, 4 Drawing Sheets

(51) Int. Cl.
    *G06Q 30/0217*     (2023.01)
    *G06Q 30/0207*     (2023.01)

(58) Field of Classification Search
    CPC ............ G06Q 10/067; G06Q 30/0246; G06Q 30/0207
    See application file for complete search history.

(56) References Cited

U.S. PATENT DOCUMENTS

| | | | | |
|---|---|---|---|---|
| 9,875,614 | B2* | 1/2018 | McCoy | G07F 17/3255 |
| 10,478,729 | B1* | 11/2019 | Wells | A63F 13/352 |
| 2007/0073614 | A1* | 3/2007 | Jung | G06Q 30/02 705/14.27 |
| 2014/0087849 | A1* | 3/2014 | Page | G07F 17/3246 463/25 |
| 2016/0042607 | A1* | 2/2016 | McCoy | G07F 17/3255 463/25 |
| 2018/0350144 | A1* | 12/2018 | Rathod | G06Q 20/3224 |
| 2019/0340631 | A1* | 11/2019 | Seshadri | A63F 13/30 |
| 2020/0167814 | A1* | 5/2020 | Rodriguez Bravo | G06Q 30/0209 |

FOREIGN PATENT DOCUMENTS

| | | | | |
|---|---|---|---|---|
| JP | 2009-87091 A | * | 4/2009 | ............ G06Q 20/00 |
| KR | 2009-0078815 A | * | 8/2008 | ............ G06Q 30/00 |
| WO | WO 03/073236 A2 | * | 9/2003 | |
| WO | WO 2019/213056 A1 | * | 11/2019 | ........... A63F 13/216 |

OTHER PUBLICATIONS

R. Rachmadi; R. Chairullah; V. Levina; M.R. Pambudi; HLHS Warnars; T. Matsuo, Online Game Marketplace for Online Game Virtual Item Transaction (English), 2019 8th International Congress on Advanced Applied Informatics (IIAI-AAI) (pp. 869-872, Jul. 1, 2019 (Year: 2019).*

Foong Li Law; Kasirun, Z.M.; Chun Kiat Gan, Gamification towards sustainable mobile application (English), 2011 Malaysian Coference in Software Engineering(pp. 349-353), Dec. 1, 2011 (Year: 2011).*

Sang-Yeal Han; Moon-Kyo Cho; Mun-Kee Choi, Ubitem: a framework for interactive marketing in location-based gaming environment (Englsih), International Conference on Mobile Business (ICMB'05) (pp. 103-108), Jan. 1, 2005 (Year: 2005).*

Kei'Ichiro Yamamoto; Victoria McArthur, Digital economies and trading in counter strike global offensive: How virtual items are valued to real world currencies in an online barter-free market (English): 2015 IEEE Games Entertainment Media Conference (GEM) (pp. 1-6), Jan. 29, 2015 (Year: 2015).*

* cited by examiner

LOYALTY PLATFORM INTEGRATION PROCESSING

BACKGROUND

Consumers are inundated with a myriad of loyalty-based programs and services offered by retailers. Nearly every retailer has their own loyalty program, even the smallest of retailers that are primarily just located in a single store or confined in one geographical location. Unfortunately, because of the choices and the different electronic interfaces, few consumers actively participate in any substantial manner with these programs and many consumers fail to participate at all beyond initial signups (which are usually induced by a clerk at a retailer during a signup promotion in which the consumers get a discount on a transaction or some free gift).

Loyalty is often associated with brand associations to the retailers. Brand differentiation is a critical challenge faced by retailers. With a large array of choices available to consumers and widespread customer indifference, retailers are struggling to differentiate themselves from the competition. For instance, local supermarket chains are experiencing intensified competition as global brands spread their footprints and disrupt foreign markets. Essentially, retailers are fighting to stay relevant to their customers.

Customer retention is the biggest challenge faced by the retailers and loyalty programs are believed to be the best mechanism by which retailers can connect and engage their customers and differentiate their brands. Most retailers have outdated loyalty programs that do not maximize customer engagement for brand recognition and customer retention. In fact, many existing loyalty programs predate the digital era and do not harness modern technologies. Such legacy programs limit a retailer's ability to implement enticing, dynamic, and customer-centric programs.

As a result, many current loyalty programs struggle to connect with modern day customers who are far more technologically savvy than their predecessors. Today's consumers are by and large socially connected and crave more enjoyable and personalized experiences that resonate personally with them.

SUMMARY

In various embodiments, methods and systems for loyalty platform integration processing are presented.

According to an embodiment, a method for loyalty platform integration processing. Specifically, in an embodiment, rules for obtaining artifacts are enforced based on activities of a user determined from transactions and game play associated with a game. An accumulated level of the artifacts are maintained on behalf of the user. The game is initiated on a user device during or after a given transaction. The accumulated level of the artifacts are updated with game earned artifacts at conclusion of the game and with transaction earned artifacts after the given transaction. A dashboard service is provided on the user device depicting a ranking of the user with respect to other users of a community based on one or more of: the accumulated level of the artifacts and the activities.

DETAILED DESCRIPTION

Figure 1:
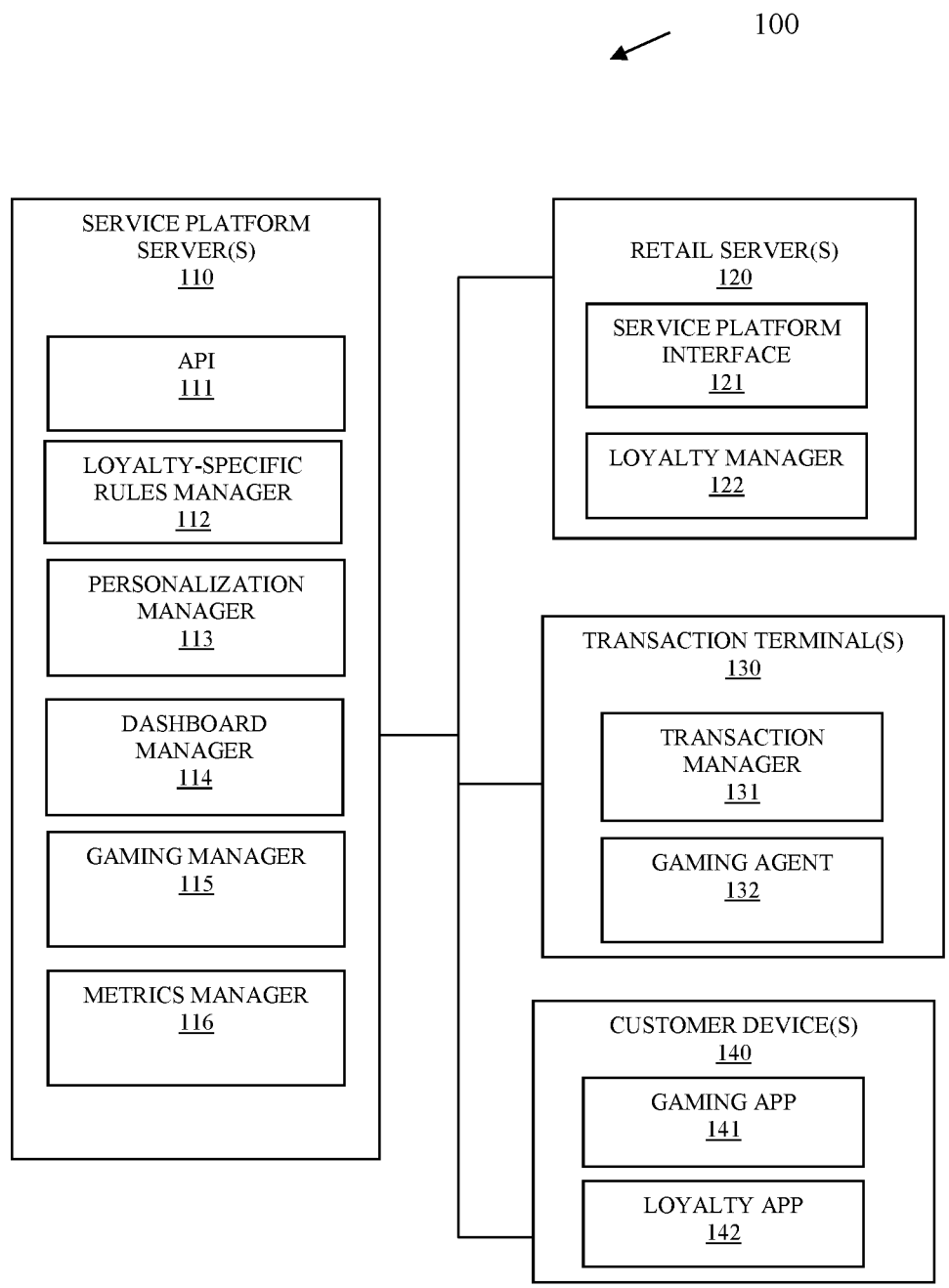
FIG. 1 is a diagram of a system for loyalty platform integration processing, according to an example embodiment.

FIG. 1 is a diagram of a system 100 for loyalty platform integration processing, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the loyalty platform integration processing techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for loyalty platform integration processing can be implemented in all, or some combination of the components shown in different hardware computing devices having one or more hardware processors.

As used herein, a "retailer" is a business that engages in transactions with a consumer. A retailer can include: financial institutions, non-profit organizations, conventional businesses (small or large), and government-based agencies.

The terms "user," "consumer," and "customer" may be used synonymously and interchangeable herein and below.

The term "gamification" refers to Application Programming Interfaces (APIs), game-based software elements/components, and/or game-based functions/operations that introduce a gaming context or a gaming environment to enhance existing non-gaming services associated with existing loyalty systems.

As will be discussed more completely herein and below system 100 permits standalone game-based loyalty services and/or enhanced game-based services that are integrated into existing loyalty services of retailers (as gamification). The features and functions of the services that follow provide a customer-centric focus integrated across all touch-points of the customers for purposes of actively engaging the customers in games and/or contests, and for purposes of providing useful metrics to the retailers and customer-meaningful interactions between the retailers and their customers. As a result of these services, retailers are able to identify customer trends, modify desired customer behaviors through gaming activities/contexts, and provide more cost-effective promotions to enhance branding of the retailers with their customers.

The system 100 includes: one or more service platform servers 110, one or more retail servers 120, one or more transaction terminals 130, and one or more customer-operated devices 140.

Each device 110-140 includes its own processors and non-transitory computer-readable storage media having executable instructions. The executable instructions when executed by the corresponding processor from the corresponding non-transitory computer-readable storage medium perform processing discussed herein and below for: API 111, loyalty-specific rules manager 112, personalization manager 113, dashboard manager 114, gaming manager 115, metrics manager 116, service platform interface 121, loyalty manager 122, transaction manager 131, gaming agent 132, gaming application (app) 141, and loyalty app 142.

The system 100 when processed provides personalized user-based game activities that can be integrated with retailer-provided promotions of existing loyalty programs/systems and/or that can provide social based artifacts to improve a social status of the user based on performance of desired activities. The rewards (promotions and artifacts) are personalized to the user, promotions and artifacts are earned through performance of retailer-driven actions by the users, and some artifacts are earned as social standing or accomplishment within a community of users.

API 111 permits access to component microservices 112-116 through service platform interface 121, gaming agent 132, gaming app 141, and/or loyalty app 142. Initially, service platform interface 121 is accessed by a retailer to define a custom-level of gamification between a retailer's loyalty app 142 that the retailer desires through gaming manager 115.

Loyalty-specific rules manager 112 permits the retailer through platform interface 121 to define rules with respect to the retailer's loyalty customers for: 1) types of rewards, such as accumulation of retailer loyalty points, retailer provided promotions, third-party rewards offered through partnership with the retailer (can be online gaming artifacts for use in an online game or promotion on a partner's product or service), social standing artifacts, stars and badges (as discussed in embodiments below), etc.; 2) activities and accumulated levels for a given activity that generate specific types of rewards; 3), events or milestones for activities or accumulated level of a given activity for which notifications are to be sent to loyalty manager 122; 4) selection of gamification elements provided and managed by gaming manager 115; and 5) assignment of gamification elements to the types or rewards, activities, and events.

The gamification elements may be processed through access to a Uniform Resource Locator (URL) link called directly from loyalty manager 122, gaming agent 132, gaming app 141, and loyalty app 142. Access to the URL or a container object/file causes the gamification elements to be processed and provide game play and/or dashboard services 114 to be generated and presented on terminals 130 and devices 140.

Service platform interface 121 may also be operated by the retailer to define activities associated with customer personalization, which is managed through the API 111 by personalization manager 113. Users may be sent surveys either through loyalty manager 122, through personalization manager 113, through gaming agent 132, and/or through gaming app 141 to identify specific interests of the users/customers. For example, "do you prefer dining in or dining out?" "do you prefer sports or movies?" "do you enjoy electronics" etc. The answers to these surveys are retained in profiles for the users/customers, and profile elements can be assigned to specific products or services that are relevant to rewards offered by the retailer for playing games associated with the gamification elements. In this way, the rewards can be personalized to each customer of the retailer. The profile generated from the surveys can also be automatically generated based on transaction histories of the users/customers (for example, a customer spends above a threshold amount on sporting events, clothes of a certain type, or dining at a particular restaurant or type of restaurant).

In an embodiment, a gamification element is a game that is based on activities defined by the rules having rewards provided as stars (the stars are gamification elements associated with games and transaction activities). Loyalty users/customers achieve status (events or milestones) through accumulation of the stars (e.g., first status level for 10 stars accumulated is Bronze, a second status level for 50 stars accumulated is Silver, a third status level for 100 stars accumulated is Gold, etc.). Each status level is assigned to better rewards (e.g., 10% off next transaction, 25% off next transaction, 50% off next transaction, etc.). The actual products or services associated with any given reward may be personalized based on the profile achieved through the personalization manager 113. The rules may also permit accumulation of stars for purposes of the customer's completing surveys, such that better personalization of rewards can be made to each customer of the retailer (for example, free tickets to a sporting event, a free dinner at a restaurant upon reaching Gold status). Rules may also allow accumulation of stars through any retailer-defined behavior of the customer, such as social media posts, social media likes, reaching a desired spending level, achieving a threshold number of visits to a given retailer, etc. So, stars are accumulated through a variety of actions and behaviors defined in the rules by the retailer through platform interface 121.

In addition, gamification elements can be associated with the rules to multiple different types of rewards, such that real rewards (discounts, promotions, gifts) are achieved and virtual or social rewards may be simultaneously achieved. For example, in order to continue a desired positive behavior, the retailer may award badges for purposes of reflecting a social status of the customer within a community of users. This is a virtual artifact that is accumulated in addition to the real rewards to encourage active participation in the gamification elements. These may be visual stimulating for purposes of uniquely validating accomplishments and promote feelings of worth by the customers. The virtual artifacts may be achieved at different levels while the stars or real awards are accumulated based on the same activities of the customer or may be achieved based on completely different activities of the customer, such as based on donating to a charity to receive a Goodwill badge. The badges are displayed within the community to the other users.

Dashboard manager 114 performs centralized management where customers can see their profile, earned status associated with obtaining real rewards, and virtual artifacts associated with community standing relative to other users of the community. A user ranking within the community may also be displayed or provided through the dashboard manager 114. The dashboard manager 114 provides progress updates, performance metrics, profile details, rankings, status, artifacts, and activities needed to reach a next status or a different artifact for purposes of encouraging competition and completion of activities based on perceived community standing. The dashboard information is available each time the user accesses loyalty app 142, gaming app 141, or performs a transaction through gaming agent 132 via API 111 in order to foster continued participation, increased participation, and competition.

Metrics manager 116 is accessible through platform interface 121 to the retailer for purposes of defining custom reports and receiving custom notifications based on activities performed by the retailer's customers with the gamification elements/components. For example, a total number of users/customers within a defined period of time performed a given activity, a total number of users engaging in activity from a first period increased by X % in a next period, a total number of users having reached a defined status level, a listing of the top 10 ranked customers for a defined period, etc.

One a retailer has defined the rules as discussed above, the system 100 is operational to engage customers in competition and games that enhance the retailer's existing loyalty program. Whenever a user/customer engages in a transaction with a transaction terminal 130 or engages in a transaction online via a customer device 140, the user is identified through an entered or supplied loyalty number for a given retailer. This can be done through a loyalty card being read, a loyalty number being entered into a transaction interface associated with the transaction, or other identifying information that permits loyalty manager 122 to identify the customer (such as entry of a phone number and/or name by the customer). Transaction manager 131 provides the loyalty account identifier and transaction details for the transaction to loyalty manager 122 and/or through API 111. If loyalty manager 122 receives the transaction details, manager 122 forwards the loyalty account and transaction details to API 111. The retail-specific rules manager 112 is engaged to evaluate the transaction details in accordance with the customer rules to identify conditions that trigger accumulation of rewards (e.g., stars and/or badges) and that trigger any gamification elements from gaming manager 115. Each user account associated with a loyalty system of loyalty manager 122, is also mapped to an account maintained by API 111. A current account for the corresponding platform server account and state of the account is obtained, such as rewards, badges, transaction history, activity history, etc. The gamification element from gaming manager 115 is configured based on the state of the account and delivered as a reference of container object to gaming agent 132, gaming app 141, or loyalty app 142 and played or dashboard information for the current activity associated with the transaction details are updated and presented.

In an embodiment, the gamification element is a wheel of chance that permits the customer to spin a wheel for a chance to obtain a range of random amounts of artifacts (e.g., stars) from a one or a few to an extremely large quantify of artifacts. The quantity of artifacts are then assigned to the platform-server account for the user. Dashboard services 114 then show through an interface the recent activity and quantity of artifacts awarded. The customer may interactively click on dashboard options to see a variety of recent or historical activities and corresponding quantity of artifacts that were awarded as well as the current social media status badges and rankings of the user/customer within the community.

In an embodiment, rather than a wheel of chance any game may be activated such as matching objects hidden behind doors, pulling a slot machine, answering a trivia question (which may be facts about a given retailer associated with a loyalty program of the customer and which may be sent as daily facts to the customer through loyalty app 142, text message, and/or email such that the customer should know the answer to the trivia question, and any other game of chance or skill.

In an embodiment, a retailer may offload its loyalty program for management by platform server 110, such that there is no specific retail loyalty program. In this scenario, gaming app 141 is used by the customer after the customer registers through API 111 as a customer. A single customer registered for the loyalty account can have multiple different loyalty accounts managed through server 110, some can be completely outsourced to server 110 and some may be enhanced in the manners discussed above through loyalty apps 142 for other retailers.

In an embodiment, a user/customer may register for an account with platform server 110 and then assign existing loyalty accounts possessed by the customer with given retailers. Provider server 110 maintains mappings between a registered user identifier or account and each of the user identifiers associated with the other retailers. In such embodiments, provider server 110 maintains a globally mapped user identifier for the user/customer and may be activated through either a retailer enhanced loyalty app 141 and/or gaming app 142.

In an embodiment, server 110 is a cloud-based server and API 111 is a cloud-based API. Micro-services 112-116 can be scaled to additional servers as needed based on volume of traffic and based on the current number of devices 130 and 140 connecting to API 111 at any given point in time.

In an embodiment, transaction terminals 130 can include: Point-Of-Sale (POS) terminals, Self-Service Terminals (SSTs), kiosks, self-service checkouts, fuel pump kiosks, and Automated Teller Machines (ATMs).

In an embodiment, customer devices 140 can include: desktop computers, tablet computers, laptop computers, wearable processing devices, mobile phones, voice-enabled network device (e.g., Amazon Echo®, Google Home®, Apple Siri®, etc.), and network-based transactional appliances that are part of the Internet-of-Things (IoTs).

These and other embodiments are now discussed with reference to the FIGS. 2-4.

Figure 2:
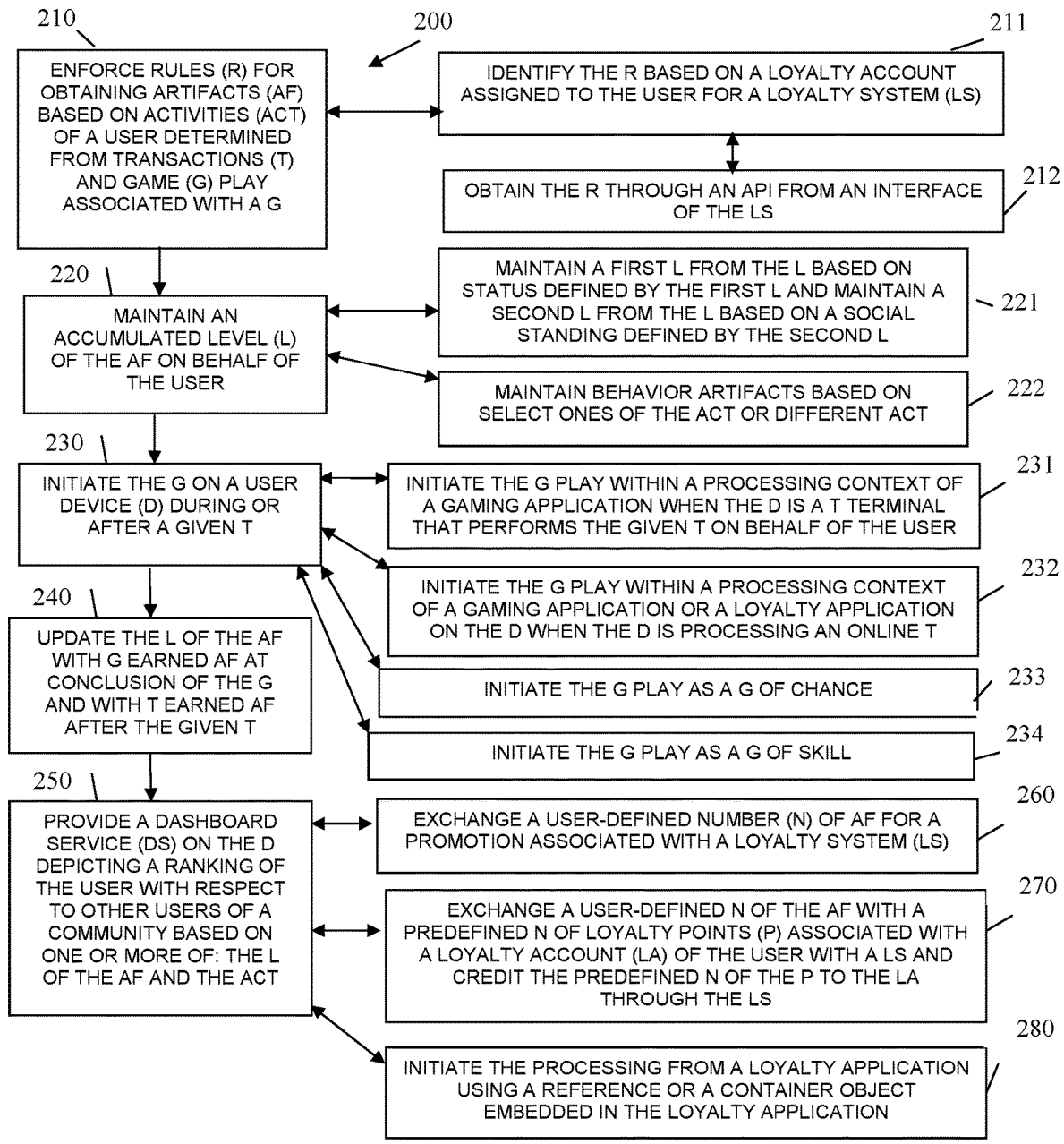
FIG. 2 is a diagram of a method for loyalty platform integration processing, according to an example embodiment.

FIG. 2 is a diagram of a method 200 for loyalty platform integration processing, according to an example embodiment. The software module(s) that implements the method 200 is referred to as a "loyalty gamification integrator" The loyalty gamification integrator is implemented as executable instructions programmed and residing within memory and/or a non-transitory computer-readable (processor-readable) storage medium and executed by one or more hardware processors of a hardware computing device. The processors of the device that executes the loyalty gamification integrator are specifically configured and programmed to process the loyalty gamification integrator. The loyalty gamification integrator has access to one or more networks during its processing. The networks can be wired, wireless, or a combination of wired and wireless.

In an embodiment, the device that executes the loyalty gamification integrator is platform server 110. In an embodiment, the server 110 is one of several servers that cooperate as a cloud processing environment (cloud).

At 210, the loyalty gamification integrator enforces rules for obtaining artifacts based on activities of a user determined from transactions and game play associated with a game. The artifacts can be real world promotions or gifts and virtual rewards for purposes of standing within a social community of users.

In an embodiment, at 211, the loyalty gamification integrator identifies the rules based on a loyalty account assigned to the user for a loyalty system that administers or manages a loyalty program for which the user is enrolled.

In an embodiment of 211 and at 212, the loyalty gamification integrator obtains the rules through an API 11 from an interface 121 of the loyalty system associated with a loyalty server 120.

At 220, the loyalty gamification integrator maintains an accumulated level of artifacts on behalf of the user.

In an embodiment, at 221, the loyalty gamification integrator maintains a first accumulated level from the accumulated artifacts based on a status or status level defined by the first accumulated level. The loyalty gamification integrator also maintains a second level from the accumulated artifacts based on a social standing defined by the second accumulated level.

In an embodiment, at 222, the loyalty gamification integrator maintains behavior artifacts based on select ones of the activities or based on completely different activities that have nothing whatsoever to do with the transaction-based activities. These were described as social badges above to encourage socially responsible behaviors, such as volunteering, recycling, donating to charities, etc.

At 230, the loyalty gamification integrator initiates the game on a user device during or after a given transaction.

In an embodiment, at 231, the loyalty gamification integrator initiates game play within a processing context of a gaming application (gaming agent) 132 when the user device is a transaction terminal 130 that performs the given transaction on behalf of the user.

In an embodiment, at 232, the loyalty gamification integrator initiates the game play within a processing context of a gaming application 141 or a loyalty application 142 on the user device when the user device is processing an online transaction initiated by the user from the user device.

In an embodiment, at 233, the loyalty gamification integrator initiates game play as a game of chance.

In an embodiment, at 234, the loyalty gamification integrator initiates game play as a game of skill.

At 240, the loyalty gamification integrator updates the accumulated level of artifacts with game-earned artifacts at a conclusion of the game and updates the accumulated level of artifacts with transaction-earned artifacts after the given transaction based on the transaction activities.

At 250, the loyalty gamification integrator provides a dashboard service on the user device depicting a ranking of the user with respect to other users of a community based on one or more of: the accumulated level of artifacts and/or the activities.

In an embodiment, at 260, the loyalty gamification integrator exchanges a user-defined number of artifacts for a promotion associated with a loyalty system.

In an embodiment, at 270, the loyalty gamification integrator exchanges a user-defined number of the artifacts with a predefined number of loyalty points associated with a loyalty account of the user with a loyalty system and credits the predefined number of loyalty points to the loyalty account through the loyalty system.

In an embodiment, at 280, the loyalty gamification integrator is initiated from a loyalty application 142 using a reference or a container object embedded within the loyalty application 142.

Figure 3:
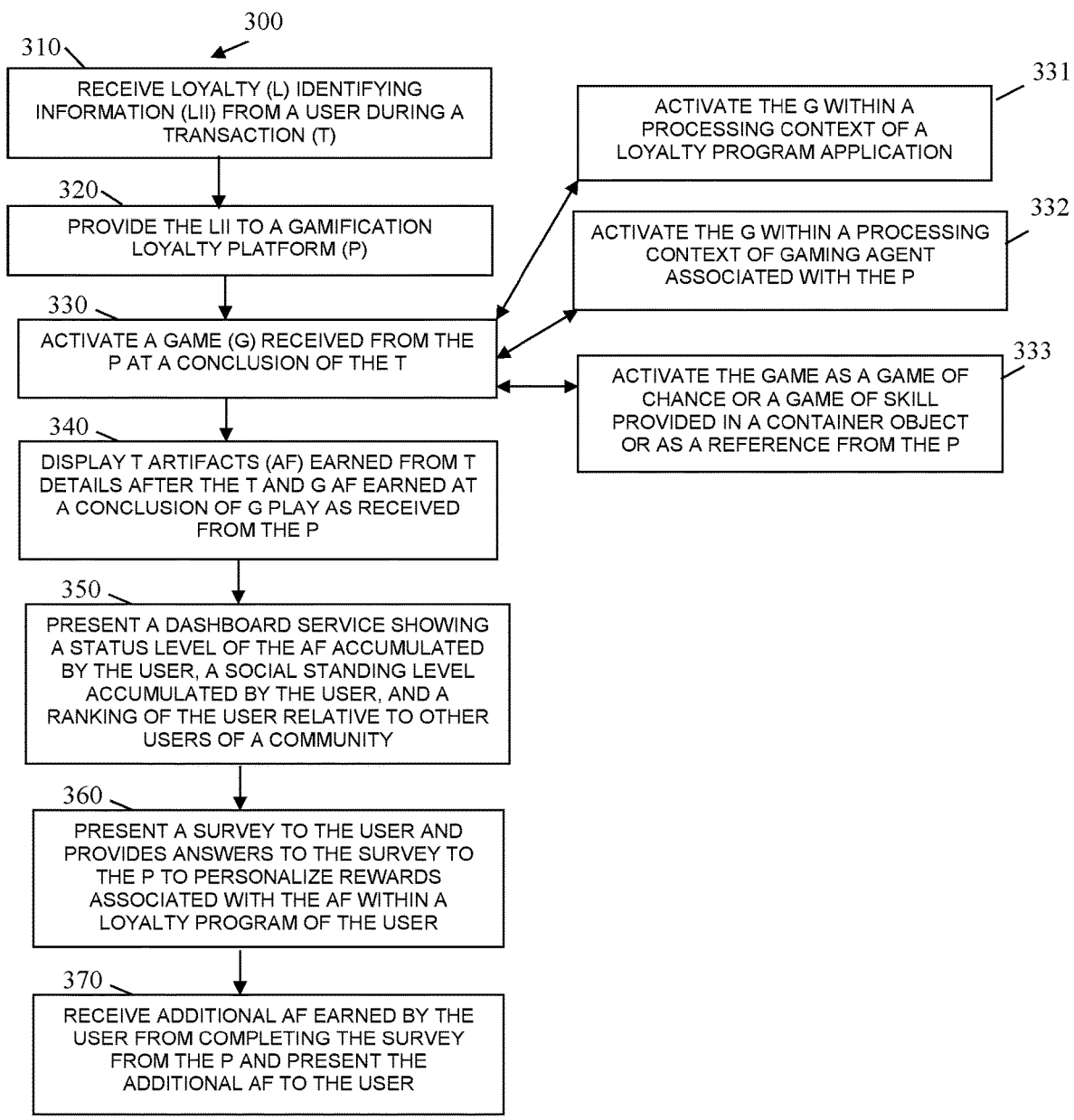
FIG. 3 is a diagram of another method for loyalty platform integration processing, according to an example embodiment.

FIG. 3 is a diagram of another method 300 for loyalty integration processing, according to an example embodiment. The software module(s) that implements the method 300 is referred to as a "transaction terminal loyalty gamification application (app)." The transaction terminal loyalty gamification app is implemented as executable instructions programmed and residing within memory and/or a non-transitory computer-readable (processor-readable) storage medium and executed by one or more hardware processors of a hardware device. The processors of the device that executes the transaction terminal loyalty gamification app are specifically configured and programmed to process the transaction terminal loyalty gamification app. The transaction terminal loyalty gamification app has access to one or more networks during its processing. The networks can be wired, wireless, or a combination of wired and wireless.

In an embodiment, the device that executes the transaction terminal loyalty gamification app is transaction terminal 130. In an embodiment, the transaction terminal 130 is: a POS terminal, an SST, a kiosk, a self-service checkout terminal, a fuel pump kiosk, or an ATM.

In an embodiment, the transaction terminal loyalty gamification app is a combination of transaction manager 131 and gaming agent 132.

In an embodiment, the device that executes transaction terminal loyalty gamification app is customer device 140. Customer device 140 is a desktop, a tablet, a laptop, a mobile phone, a wearable processing device, a voice-enabled network transaction device, or an appliance network device that is part of the IoTs.

In an embodiment, the transaction terminal loyalty gamification app is one or both of gaming app 141 and loyalty app 142.

The transaction terminal loyalty gamification app represents the processing perspective of system 100 from either transaction terminal 130 or customer device 140 whereas the method 200 of the FIG. 2 represented the processing perspective of system 100 from platform server 120.

At 310, the transaction terminal loyalty gamification app receives loyalty identifying information from a user during a transaction (this can be any touchpoint device (transaction terminal 130 or user device 140) where the transaction was initiated by the user).

At 320, the transaction terminal loyalty gamification app provides the loyalty identifying information to a gamification loyalty platform (such as server 110 using API 111).

At 330, the transaction terminal loyalty gamification app activates a game received from the gamification loyalty platform at a conclusion of the transaction.

In an embodiment, at 331, the transaction terminal loyalty gamification app activates the game within a processing context of a loyalty program application 142 (when the transaction terminal is a user device 140).

In an embodiment, at 332, the transaction terminal loyalty gamification app activates the game within a processing context of a gaming agent associated with the gamification loyalty platform (this can be gaming agent 132 when the transaction terminal is terminal 130 or gaming application 141 when the transaction terminal is user device 140).

In an embodiment, at 333, the transaction terminal loyalty gamification app activates the game as a game of chance, or a game of skill provided in a container object or as a reference from the gamification loyalty platform.

At 340, the transaction terminal loyalty gamification app displays transaction artifacts earned from transaction details after the transaction and game artifacts earned at a conclusion of game play as received from the gamification loyalty platform.

At 350, the transaction terminal loyalty gamification app presents a dashboard service showing a status level of the artifacts accumulated by the user, a social standing level accumulated by the user, and a ranking of the user relative to other users of a community (social community of gamification and loyalty users).

In an embodiment, at 360, the transaction terminal loyalty gamification app presents a survey to the user and provides answers to the survey as received from the user to the gamification loyalty platform to personalize rewards associated with the artifacts within a loyalty program of the user.

In an embodiment of 360 and at 370, the transaction terminal loyalty gamification app receives additional artifacts earned by the user from completing the survey from the gamification loyalty platform and presents the additional earned artifacts to the user on a display of the transaction terminal.

Figure 4:
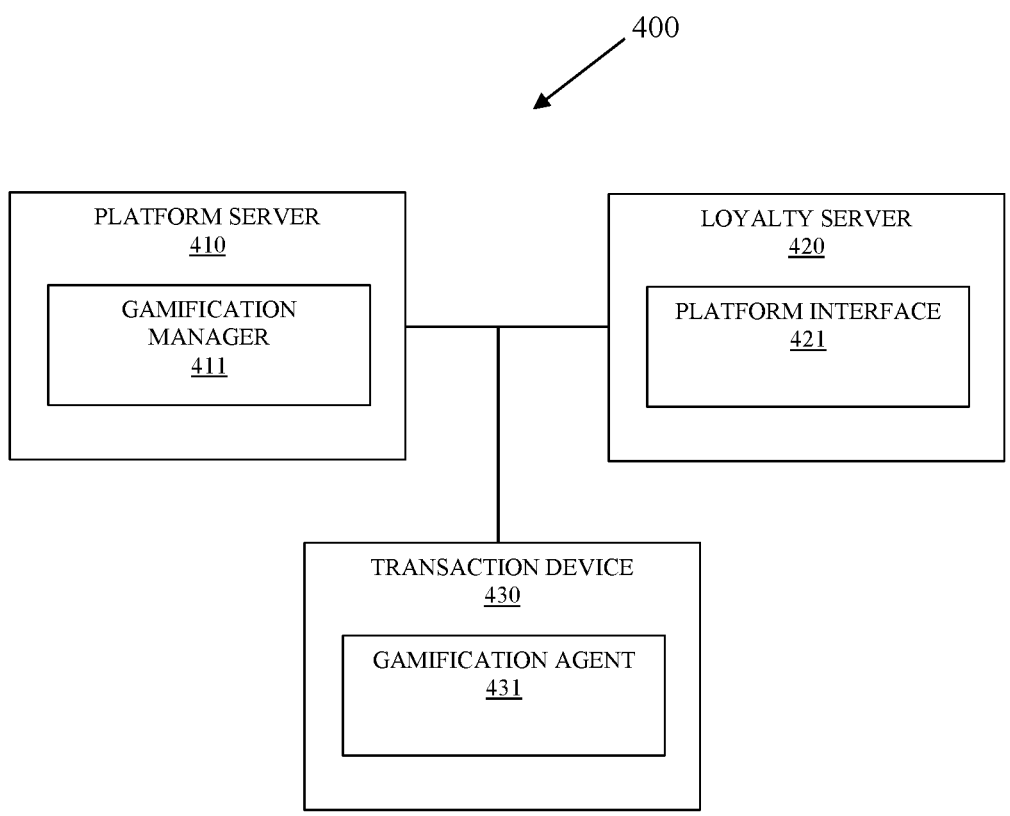
FIG. 4 is a diagram of another system for loyalty platform integration processing, according to an example embodiment.

FIG. 4 is a diagram of a system 400 for loyalty integration processing, according to an example embodiment. The system 400 includes a variety of hardware components and software components. The software components of the system 400 are programmed and reside within memory and/or a non-transitory computer-readable medium and execute on one or more hardware processors of hardware devices. The system 400 communicates one or more networks, which can be wired, wireless, or a combination of wired and wireless.

In an embodiment, the system 400 implements, inter alia, some combination of the processing discussed above with the FIGS. 1-3.

The system 400 includes a platform server 410, a loyalty server 420, and a transaction device 430.

The platform server includes a platform processor and a platform non-transitory computer-readable storage medium comprising executable instructions representing a gamification manager 411.

The gamification manager 411 when executed by the platform processor from the non-transitory computer-readable storage medium causes the platform processor to: 1) receive rules defining activities of a user for earning artifacts from a platform interface 421; 2) obtaining selections for gaming elements representing games to play in connection with transactions of the user or the activities from the platform interface 421; 3) configuring an account associated with a user with the rules and the selections; 4) deliver a reference to the gaming elements at conclusions of the transactions to a gamification agent 431; 5) evaluating the rules in connection with the activities and game play of the gaming elements and assign accumulated levels of the artifacts to the account; and 5) providing dashboard services to the gamification agent 431 that presents the accumulated levels of the artifacts and a ranking of the user relative to other users of a community.

The loyalty server 420 includes a loyalty processor and a loyalty non-transitory computer-readable storage medium comprising executable instructions representing the platform interface 421.

The platform interface 421 when executed by the loyalty processor from the loyalty non-transitory computer-readable storage medium causes the loyalty processor to: 1) supply the rules and the selections to an API associated with the gamification manager 411; and 2) provide a loyalty account managed by the loyalty server 420 to the gamification manager 411 through the API for the gamification manager 411 to link the loyalty account to the account managed by the platform server 420.

The transaction device 430 comprises a transaction processor and a transaction non-transitory computer-readable storage medium having executable instructions representing the gamification agent 431.

The gamification agent 431 when executed by the transaction processor from the transaction non-transitory computer-readable storage medium causes the transaction processor to: 1) report loyalty information during the transactions to the gamification manager 411 using the API; 2) report transaction details for matching to some of the activities to the gamification manager 411 using the API; 3) access the reference to play the gaming elements from the transaction terminal 430 as provided by the gamification manager 411; and 4) display the accumulated levels of the artifacts and a ranking of the user relative to other users of a community through the dashboard services provided by the gamification manager 411.

In an embodiment, platform server 410 is server 110. In an embodiment server 110 is a cloud processing environment.

In an embodiment, gamification manager 411 is all or some combination of API 111, microservices 112-116, and/or the method 200 of FIG. 2.

In an embodiment, loyalty server 420 is server 120. In an embodiment server 120 is a cloud processing environment.

In an embodiment, platform interface 421 is all or some combination of: service platform interface 121 and/or loyalty manager 122.

In an embodiment, transaction device 430 is transaction terminal 130. In an embodiment, terminal 130 is a POS terminal, an SST, a self-service checkout terminal, a kiosk, a fuel pump kiosk, or an ATM.

In an embodiment, transaction device 430 is customer device 140. In an embodiment, device 140 is: a tablet, a laptop, a desktop, a wearable processing device, a mobile phone, a voice-enabled network transaction or assistance device, or an appliance that is part of the IoTs.

In an embodiment, gamification agent 431 is all or some combination of: transaction manager 131, gaming agent 132, gaming app 141, loyalty app 142, and/or the method 300 of FIG. 3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
integrating, by executable instructions that execute on a processor of a cloud processing environment, a game associated with real-world activities of a user with existing loyalty systems of retailers and enhancing the existing loyalty systems based on game play of the game by the user and rules of the game;
providing, by the executable instructions, a gamification-based platform to the user based on the real-world activities of the user and game activities associated with the game play that are driven by the rules through an Application Programming Interface (API);

enforcing, by the executable instructions, the rules for obtaining artifacts based on the real-world activities and the game activities of a user determined from transactions between the user and the retailers and determined from the game play associated with the game, wherein enforcing further includes integrating the real-world activities associated with the transactions between the user and the retailers with the game activities associated with the game play for the game within the gamification-based platform driven by the rules, the real-world activities, the game activities, the game, and the existing loyalty systems associated with the retailers;

maintaining, by the executable instructions, an accumulated level of the artifacts on behalf of the user;

initiating, by the executable instructions, the game on a user device during or after a given transaction by the user with a particular retailer within a loyalty application that executes on the user device for the particular retailer in connection with a particular existing loyalty system of the particular retailer, wherein initiating further includes delivering a container object embedded within the loyalty application and initiating the container object from and within the loyalty application on the user device for the game play of the game;

updating, by the executable instructions, the accumulated level of the artifacts with game earned artifacts at conclusion of the game and with transaction earned artifacts after the given transaction; and providing, by the executable instructions, a dashboard service on the user device depicting a ranking of the user with respect to other users of a community based on one or more of: the accumulated level of the artifacts, the real-world activities, and the game activities.

2. The method of claim 1, wherein enforcing further includes identifying the rules based on a loyalty account assigned to the user for the particular existing loyalty system associated with the particular retailer.

3. The method of claim 2, wherein identifying further includes obtaining the rules through the API from an interface of the particular existing loyalty system.

4. The method of claim 1, wherein maintaining further includes maintaining a first accumulated level from the accumulated level based on status defined by the first accumulated level and maintaining a second accumulated level from the accumulated level based on a social standing defined by the second accumulated level.

5. The method of claim 1, wherein maintain behavior artifacts earned by the user for select ones of the real-world activities or for different real-world activities.

6. The method of claim 1, wherein initiating further includes initiating the game play as a game of chance.

7. The method of claim 1, wherein initiating further includes initiating the game play as a game of skill.

8. The method of claim 1 further comprising, exchanging, by the executable instructions, a user-defined number of artifacts for a promotion associated with the particular existing loyalty system of the particular retailer.

9. The method of claim 1 further comprising, exchanging, by the executable instructions, a user-defined number of the artifacts with a predefined number of loyalty points associated with a loyalty account of the user with the particular existing loyalty system of the particular retailer and crediting the predefined number of the loyalty points to the loyalty account through the particular existing loyalty system.

10. A method, comprising:
receiving, by executable instructions that execute on a processor of a cloud processing environment, loyalty identifying information from a user during a transaction;

providing, by the executable instructions, the loyalty identifying information to a gamification loyalty platform that integrates real-world activities performed by the user during transactions of the user with retailers and that integrates game activities performed by the user during a game play of a game with existing loyalty systems of the retailers and enhances the existing loyalty systems based on the game play of the game by the user and rules of the game;

activating, by the executable instructions, the game received from the gamification loyalty platform at a conclusion of the transaction between the user and a particular retailer within a loyalty application that executes on a user device for the particular retailer in connection with a particular existing loyalty system of the particular retailer, wherein activating further includes delivering a container object that is embedded within the loyalty application and initiating the container object from and within the loyalty application on the user device for the game play of the game;

displaying, by the executable instructions, transaction artifacts earned from transaction details after the transaction and game artifacts earned at a conclusion of game play as received from the gamification loyalty platform within the gamification loyalty platform; and presenting, by the executable instructions, a dashboard service showing a status level of the artifacts accumulated by the user, a social standing level accumulated by the user, and a ranking of the user relative to other users of a community.

11. The method of claim 10 further comprising, presenting, by the executable instructions, a survey to the user and providing answers to the survey to the gamification loyalty platform to personalize rewards associated with the artifacts within a loyalty program of the user with the particular existing loyalty system.

12. The method of claim 11 further comprising, receiving, by the executable instructions, additional artifacts earned by the user from completing the survey from the gamification loyalty platform and presenting the additional artifacts.

13. A system, comprising:
a platform server comprising a platform processor and a platform non-transitory computer-readable storage medium having executable instructions representing a gamification manager;

a loyalty server comprising a loyalty processor and a loyalty non-transitory computer-readable storage medium having executable instructions representing a platform interface;

a transaction device comprising a transaction processor and a transaction non-transitory computer-readable storage medium having executable instructions representing a gamification agent;

the gamification manager executed by the platform processor from the platform non-transitory computer-readable storage medium causing the platform processor to perform first operations comprising:
receiving rules defining real-world activities and game activities of a user for earning artifacts from the platform interface;

obtaining selections for gaming elements representing games to play in connection with transactions of the user for the real-world activities or the game activities from the platform interface;

configuring an account associated with a user with the rules and the selections;

integrating the real-world activities associated with the transactions between the user and the retailers with the game activities associated with game play for a game into a gamification-based platform driven by the rules, the activities, the game, and loyalty systems associated with the retailers enhancing the loyalty systems based on the game play of the game by the user and the rules of the game;

delivering a container object for using to the gaming elements at conclusions of the transactions to the gamification agent;

evaluating the rules in connection with the real-world activities for the transactions and the game activities associated with the game play of the gaming elements and assigning accumulated levels of the artifacts to the account; and providing dashboard services to the gamification agent that presents the accumulated levels of the artifacts and a ranking of the user relative to other users of a community;

the platform interface executed by the loyalty processor from the loyalty non-transitory computer-readable storage medium causing the loyalty processor to perform second operations comprising:

supplying the rules and the selections to an Application Programming Interface (API) associated with the gamification manager; and providing a loyalty account managed by the loyalty server of a particular loyalty system to the gamification manager through the API for the gamification manager to link the loyalty account to the account managed by the platform server;

the gamification agent executed by the transaction processor from the transaction non-transitory computer-readable storage medium causing the transaction processor to perform third operations comprising:

providing access to the gamification platform and the game within a loyalty application that executes on a user operated device for a particular retailer in connection with a particular existing loyalty system of the particular retailer by delivering the container object that is embedded within the loyalty application and initiating the container object from and within the loyalty application for the game play of the game;

reporting loyalty information during the transactions to the gamification manager using the API;

reporting transaction details for matching to some of the activities to the gamification manager using the API;

accessing the container to play the gaming elements from the transaction terminal as provided by the gamification manager; and displaying the accumulated levels of the artifacts and a ranking of the user relative to other users of a community through the dashboard services.

14. The system of claim 13, wherein the transaction device is: a Self-Service Terminal (SST), a Point-Of-Sale (POS) terminal, a kiosk, a self-service checkout terminal, a user-operated tablet, a user-operated phone, a user-operated wearable processing device, a user-operated desktop, a user-operated laptop, a user-operated voice-enabled network transaction device, and a user-operated appliance that is part of the Internet-of-Things (IoTs).

* * * * *